June 4, 1957  R. W. BROWN ET AL  2,794,211
APPARATUS FOR MOLDING ARTICLES
Filed Jan. 12, 1953  11 Sheets-Sheet 1
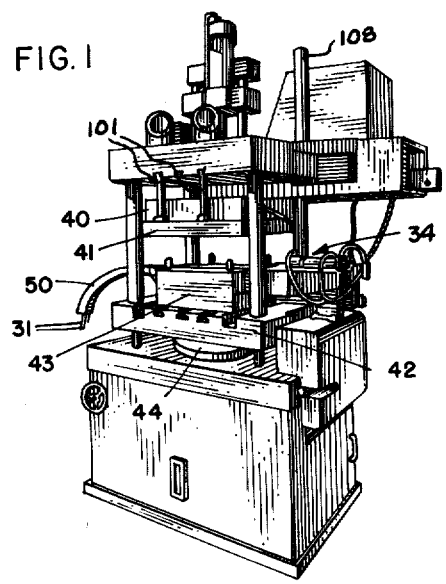
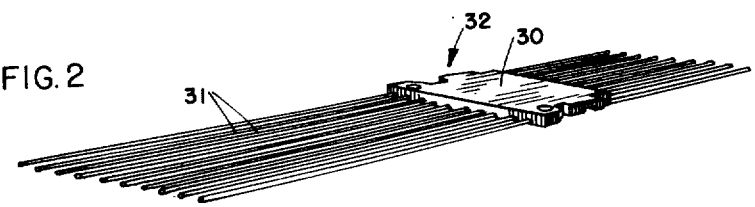
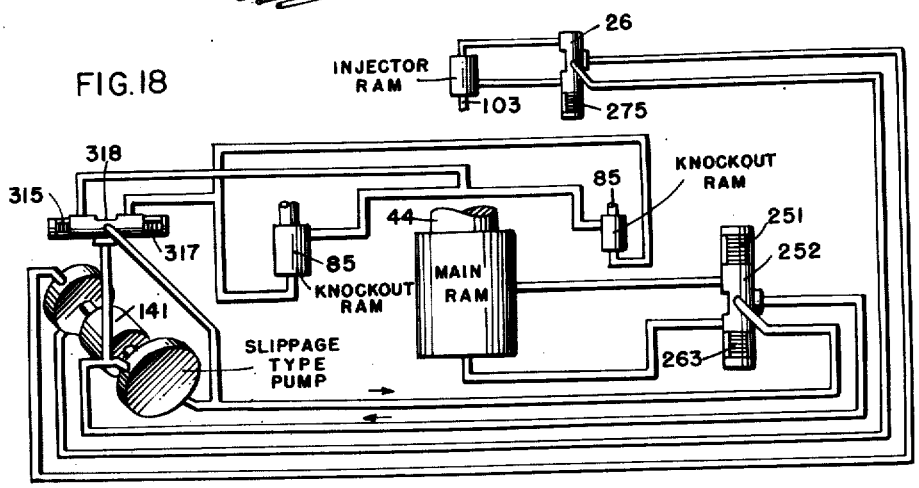
INVENTOR:
R. W. BROWN
G. A. MITCHELL
F. A. SCHULTZ
BY
ATTORNEY

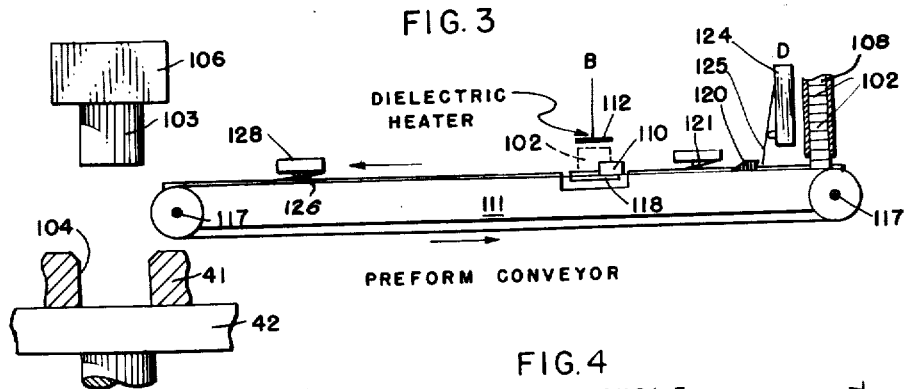

FIG. 3
PREFORM CONVEYOR

FIG. 4

| | TIME OF ONE CYCLE |
|---|---|
| PRETIMER BLOCKS OPERATION OF PRESS AT START | ———— |
| DIELECTRIC HEATER OPERATING | —  ———— |
| MAIN RAM DOWN | ———— |
| INJECTOR RAM DOWN | ———————— |
| PREFORM CONVEYOR OPERATION — FORWARD | —— |
| PREFORM CONVEYOR OPERATION — BACKWARD | — |
| PREFORM CONVEYOR OPERATION — STATIONARY | ——————————— |
| K.O. DOWN | — |
| INDEX PARTS FORWARD | —— |
| BRUSHES OPERATED | —— |
| MAIN RAM UP | ———————— |
| KNOCKOUT RAM UP | ———————— |

INVENTOR.
R. W. BROWN
G. A. MITCHELL
F. A. SCHULTZ
BY E. F. Kane
ATTORNEY

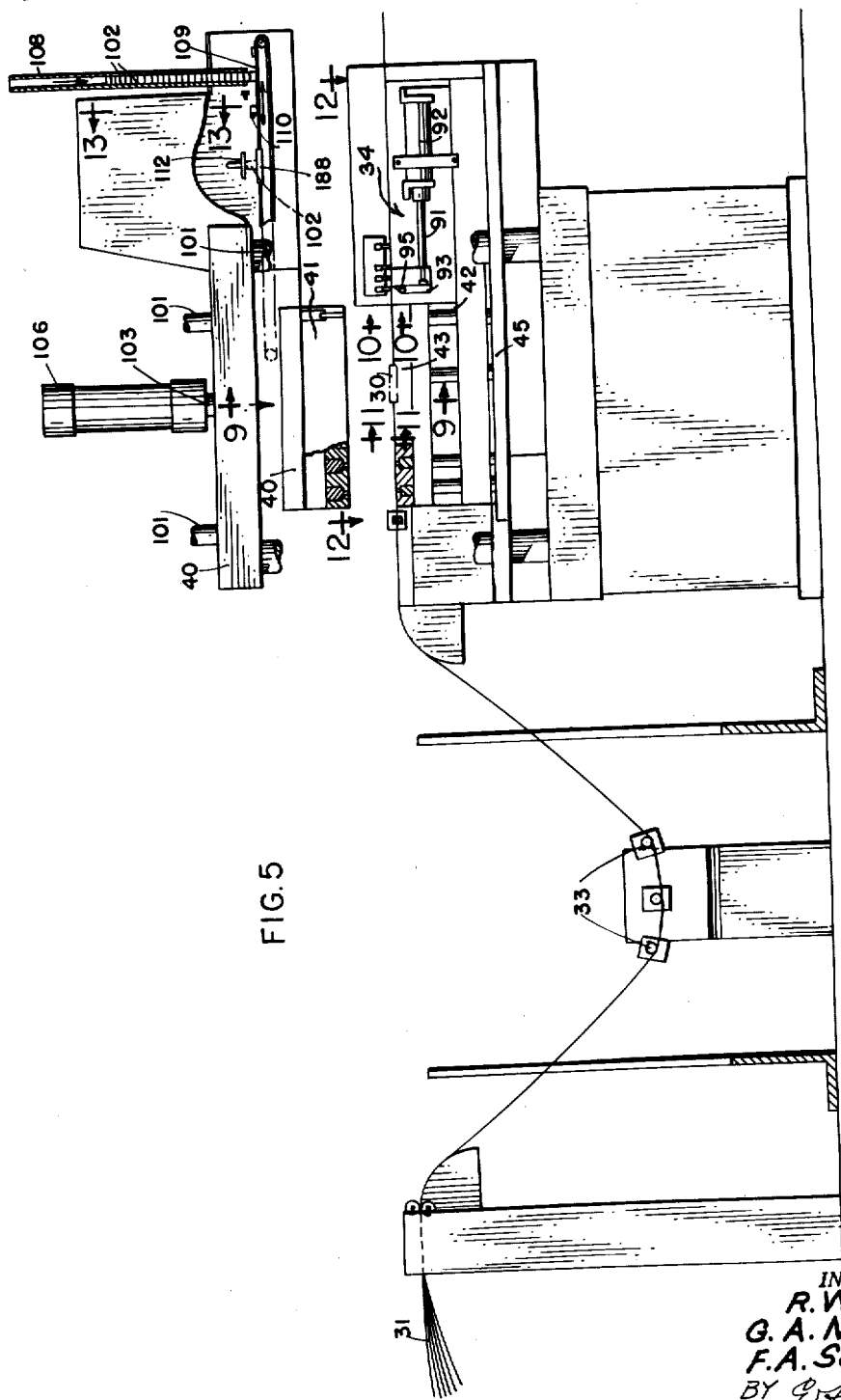

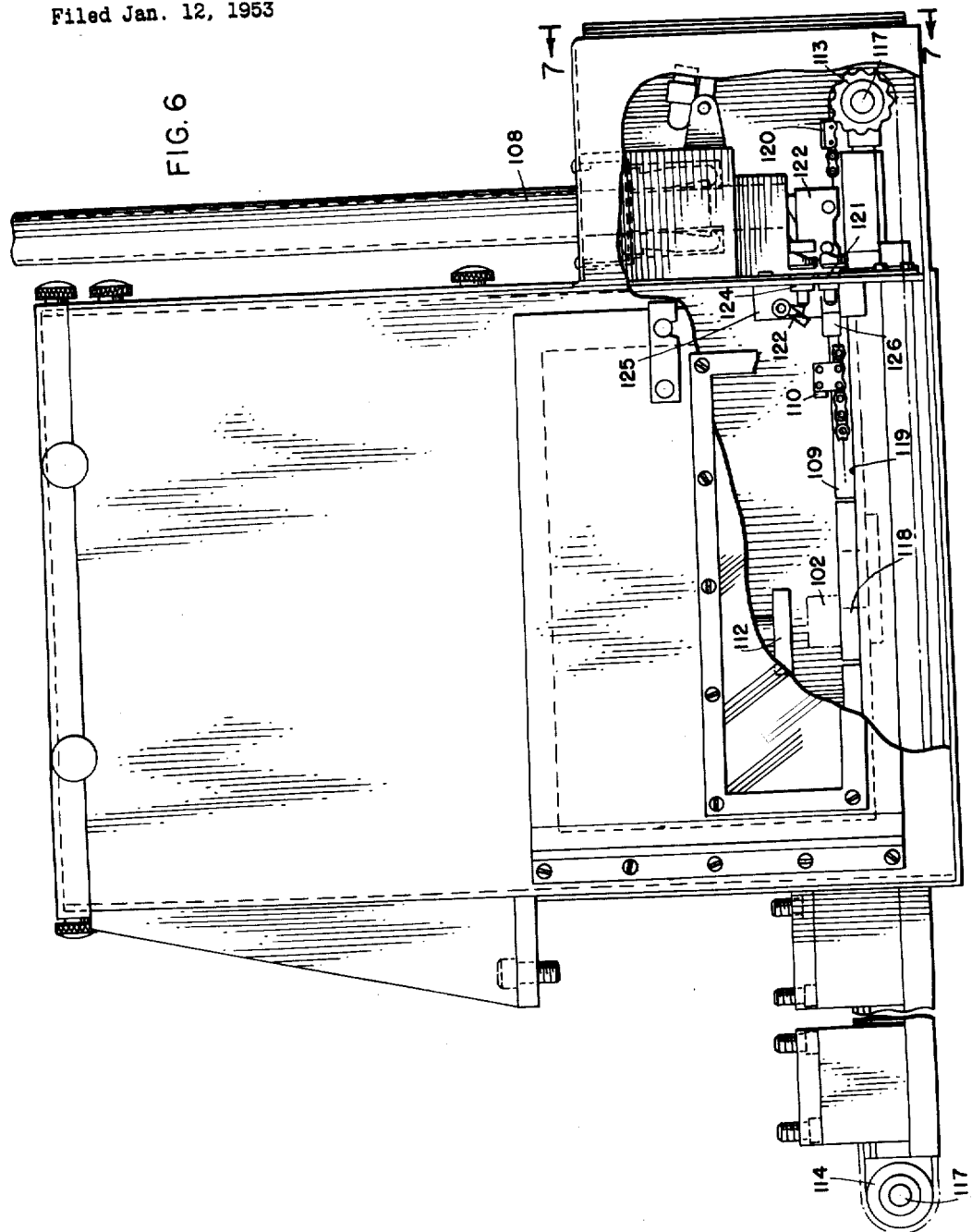

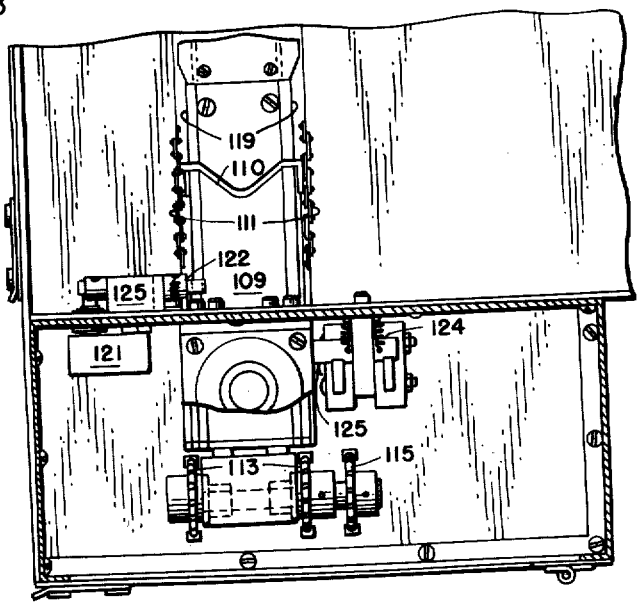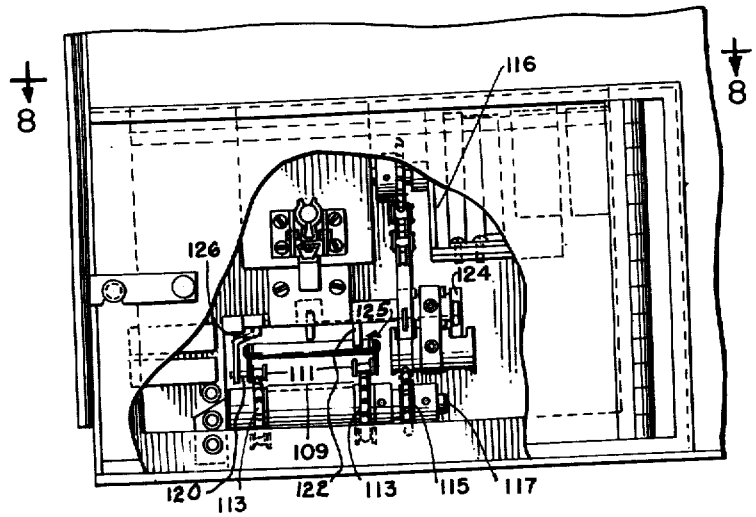

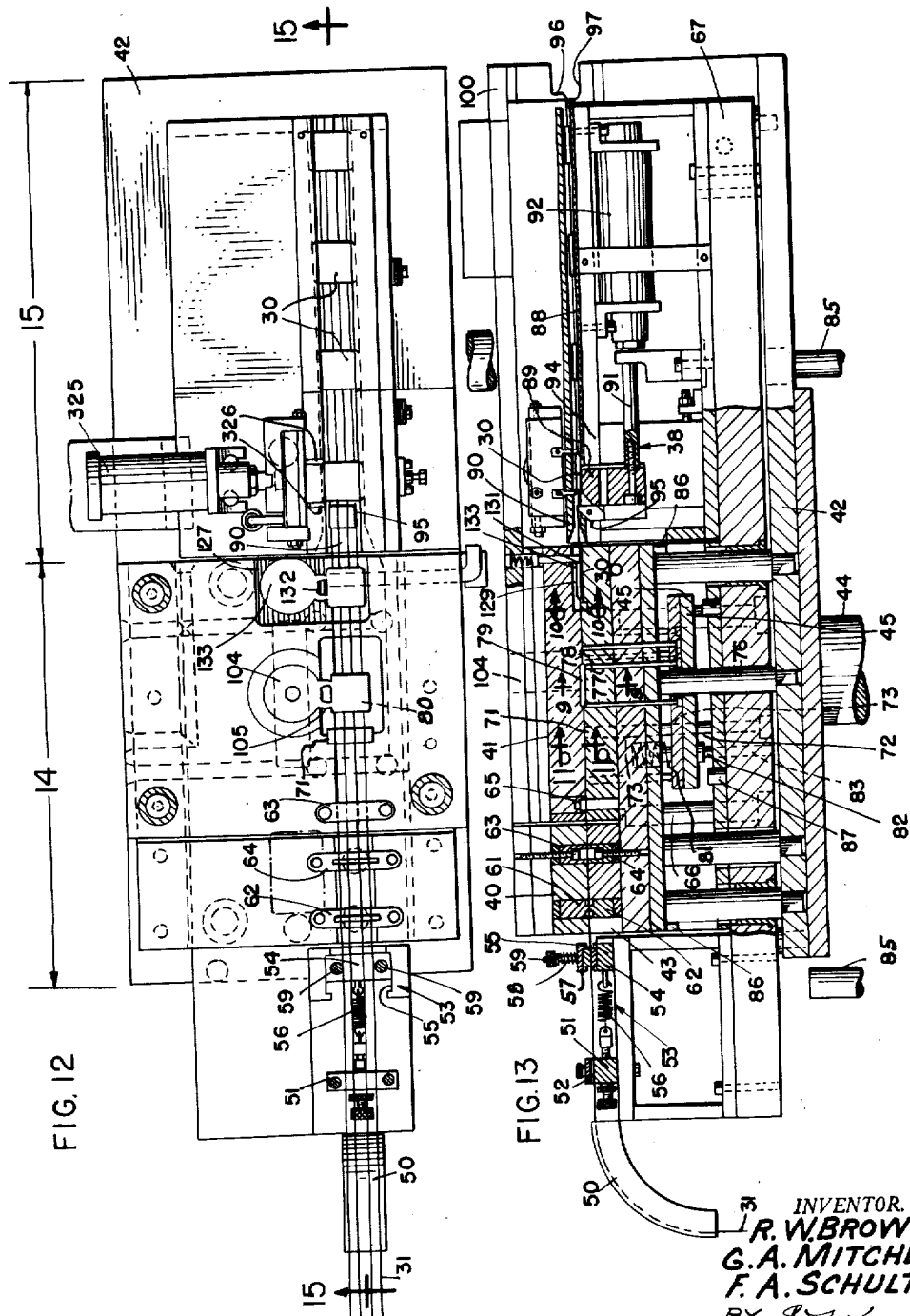

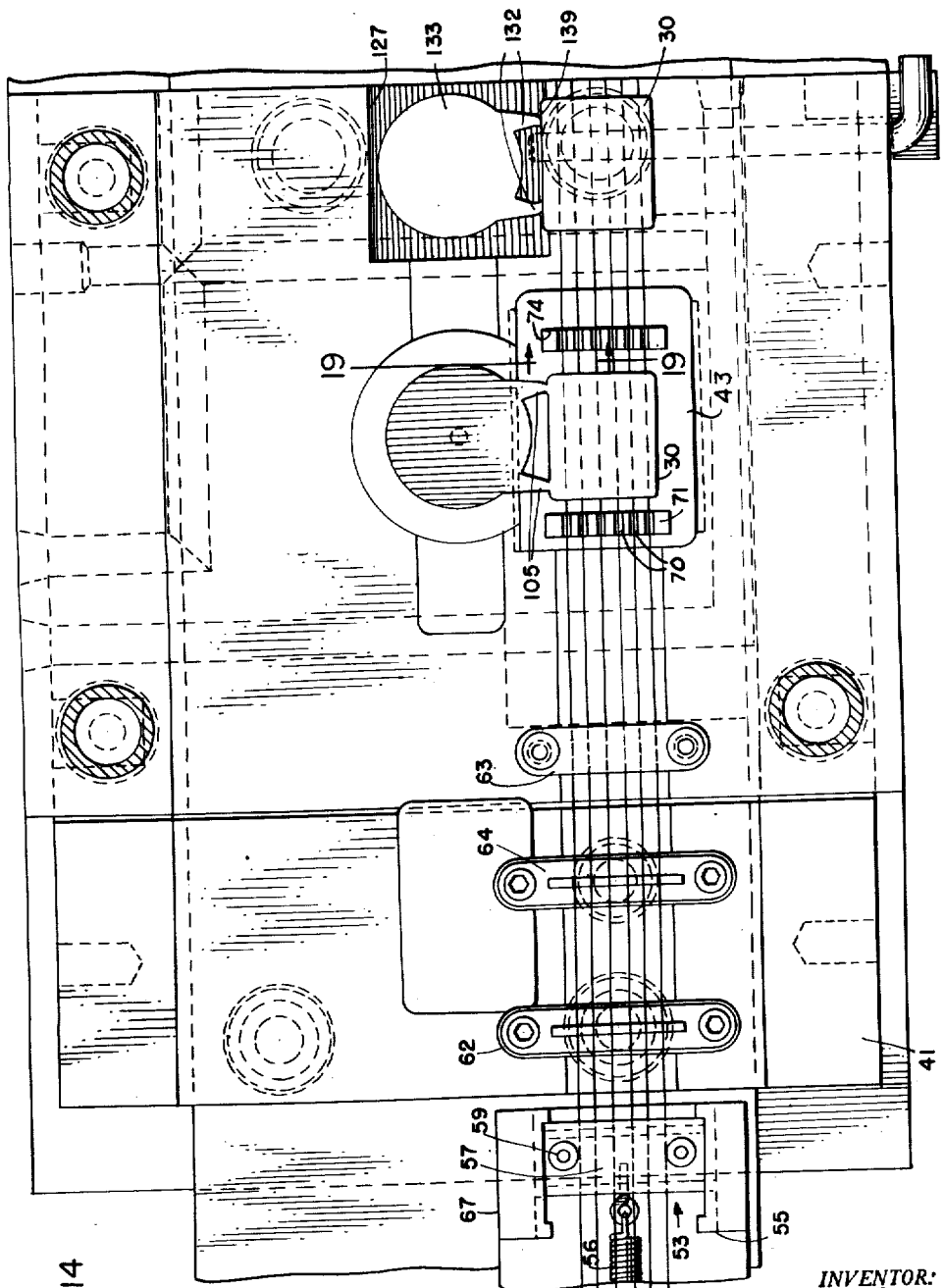

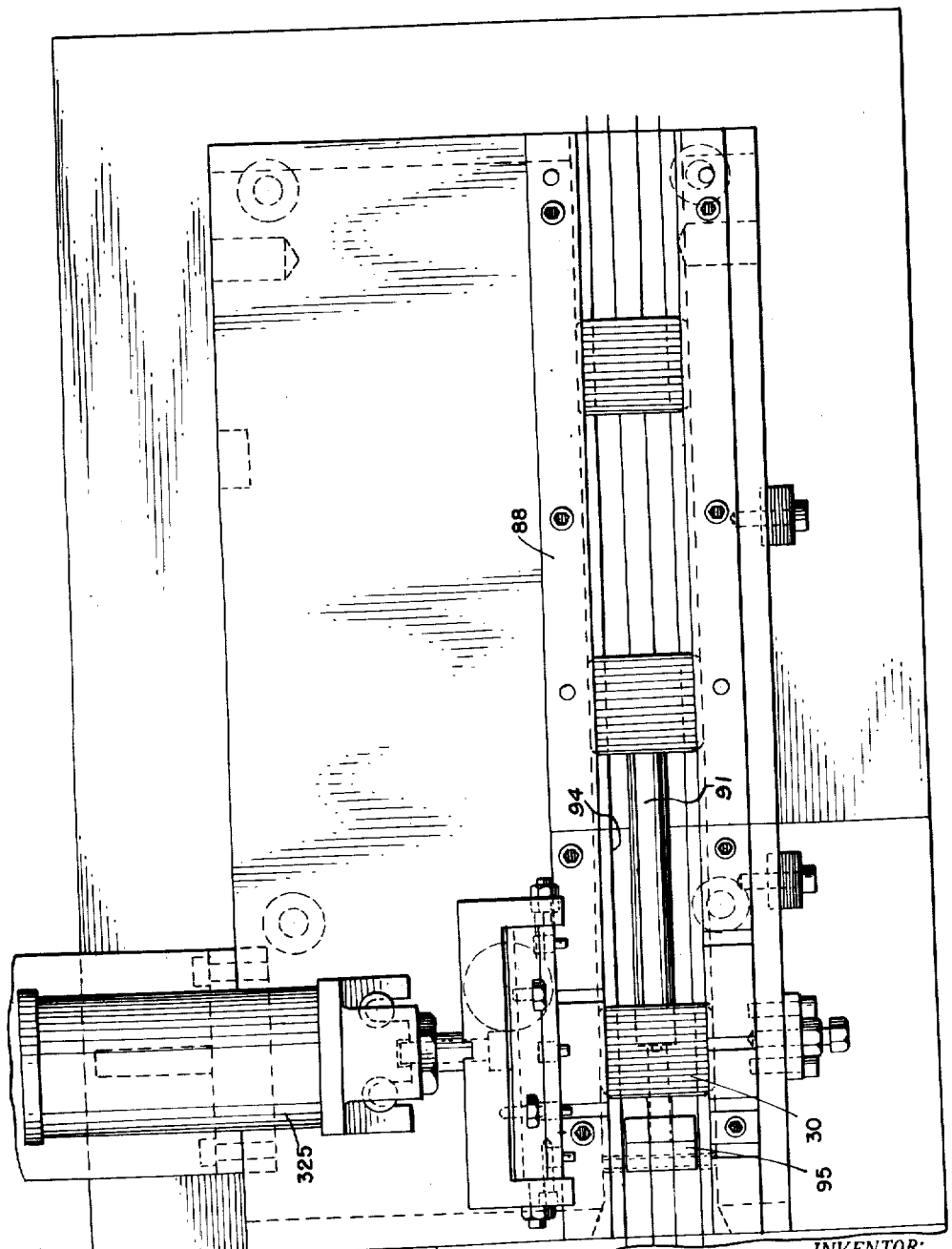

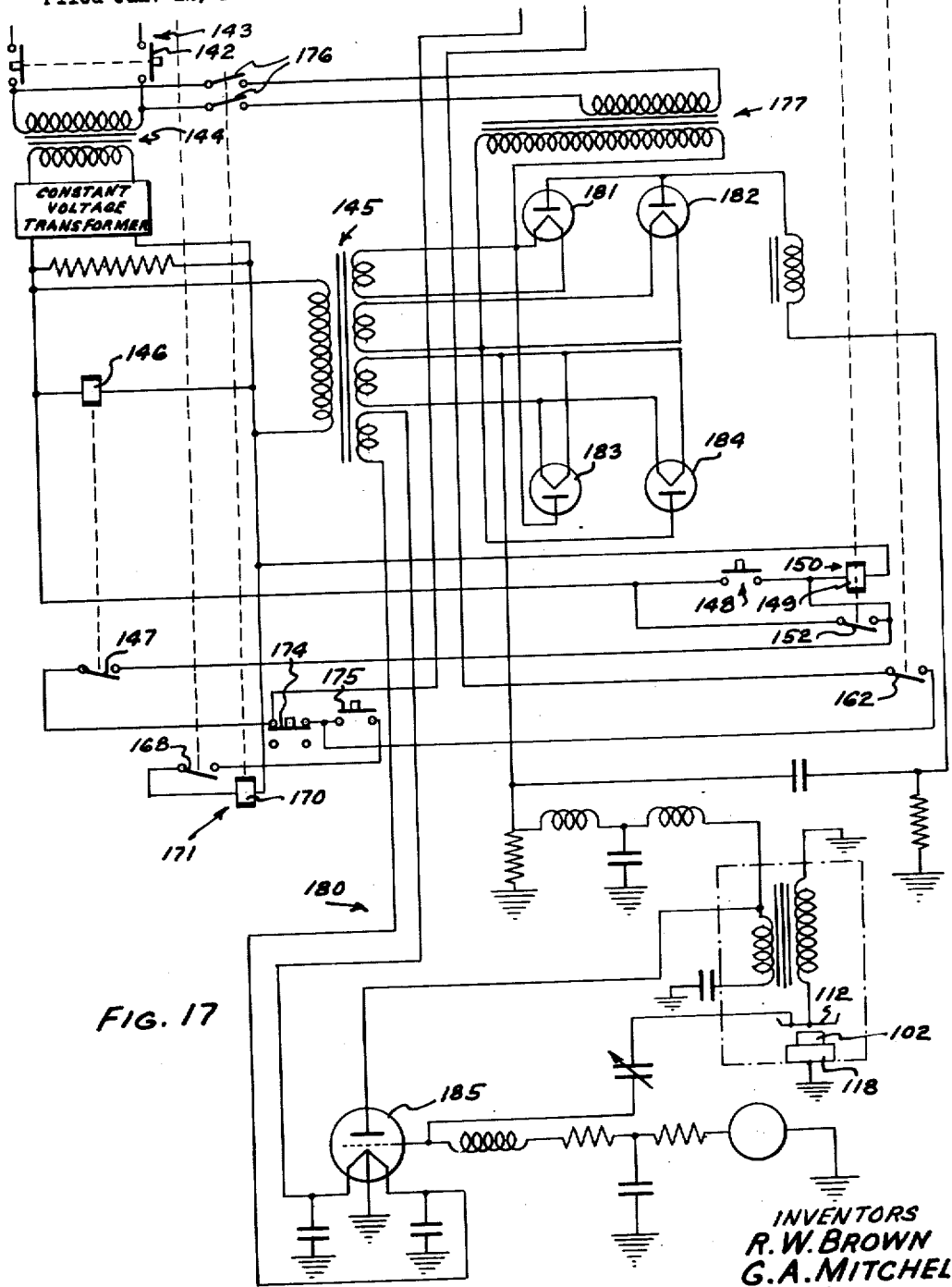

United States Patent Office 2,794,211
Patented June 4, 1957

2,794,211

APPARATUS FOR MOLDING ARTICLES

Raymond W. Brown, Evergreen Park, Gerald A. Mitchell, Maywood, and Frank A. Schultz, La Grange, Ill., assignors to Western Electric Company, Incorporated, New York, N. Y., a corporation of New York Application January 12, 1953, Serial No. 330,826

9 Claims. (Cl. 18—5)

This invention relates to apparatus for molding articles, and more particularly to apparatus for molding thermosetting compounds in the form of blocks around a plurality of wires.

In molding operations of the transfer type, a thermosetting compound is preheated, is placed in a charging chamber while hot, and is forced along heated passageways into a mold and cured. The compound must be sufficiently hot while in the charging chamber that it will readily flow through the passageways on application of pressure thereon, but must not be hot for any substantial length of time prior to its insertion into the charging chamber that precuring will occur. In the past, there has been no successful apparatus for automatically heating and delivering molding compounds to the charging chambers.

An object of the invention is to provide new and improved apparatus for molding articles.

Another object of the invention is to provide apparatus for molding thermosetting compounds in the form of strips around a plurality of wires.

A further object of the invention is to provide apparatus for transfer molding thermosetting compounds quickly and automatically around wires without precuring of the compounds.

In an apparatus illustrating certain features of the invention, a preform of a thermosetting compound is advanced to a charging chamber of a molding machine, and is dielectrically preheated to a plastic condition immediately preceding the arrival thereof at the charging chamber. The preform is subjected to pressure in the molding chamber to force the compound through heated passageways into a mold, the molded parts are ejected and the cycle is repeated automatically with the preheating of the next preform overlapping the molding operations of the preceding preform.

In an apparatus illustrating a more specific embodiment of the invention, a plurality of wires are fed to positions between upper and lower molding die sections, a preform of thermosetting compound is preheated dielectrically, and the wires are lowered onto the lower molding die section. The platens are closed, and the heated preform is moved from a heating position into a transfer chamber in the upper molding die, after which an ejector ram forces the thermosetting compound into a molding cavity surrounding the wires and the compound is cured. The platens then are opened, the molded part is ejected, a second preform is preheated, the wires and the molded part are fed and the cycle is repeated automatically.

A complete understanding of the invention may be obtained from the following detailed description of an apparatus forming a specific embodiment thereof, when read in conjunction with the appended drawings, in which Fig. 1 is a perspective view of an apparatus forming a specific embodiment of the invention;

Fig. 2 is an enlarged, perspective view of an article produced by the apparatus shown in Fig. 1;

Fig. 3 is an enlarged, fragmentary, schematic view of a portion of the apparatus shown in Fig. 1;

Fig. 4 is a sequence chart of the operation of the apparatus shown in Fig. 1;

Fig. 5 is an enlarged, front elevation of the apparatus shown in Fig. 1;

Fig. 6 is an enlarged, front elevation of a portion of the apparatus shown in Fig. 1;

Fig. 7 is a fragmentary, elevation taken along line 7—7 of Fig. 6;

Fig. 8 is a fragmentary, horizontal section taken along line 8—8 of Fig. 7;

Fig. 12 is an enlarged, top plan view of a portion of the apparatus taken along line 12—12 of Fig. 5;

Fig. 13 is an enlarged, vertical section taken along line 13—13 of Fig. 12;

Fig. 14 is an enlarged, top plan view similar to the portion of Fig. 12 indicated by the dimension 14 in Fig. 12;

Fig. 15 is an enlarged, top plan view similar to the portion of Fig. 12 indicated by the dimension 15 in Fig. 12;

Fig. 17 is a diagrammatic view of the remainder of the control circuit of which Fig. 16 shows a portion, and Fig. 18 is a fragmentary, schematic view of a hydraulic system associated with the apparatus shown in Fig. 1.

Figure 9:
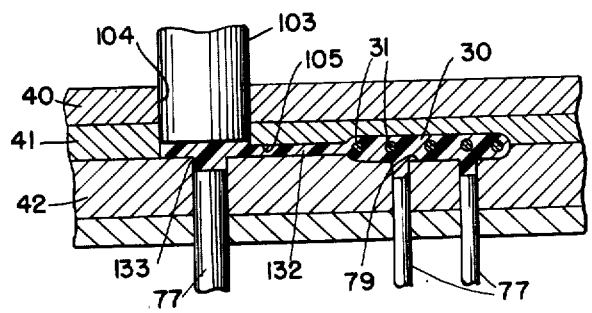
Fig. 9 is an enlarged, fragmentary, vertical section taken along line 9—9 of Figs. 5 and 13.

Referring now in detail to the drawings, there is shown in Fig. 1 a molding machine for molding a thermosetting compound such as, for example, a compound including phenol formaldehyde, "Bakelite," as the essential ingredient thereof, into a block 30 (Fig. 2) at precisely spaced points on wires 31 at each operation of the machine to form a comb 32 and cutting off a portion of the wire including one block to form a component of a relay. The wires are fed toward the machine continuously from suitable supply units (not shown) with slack portions 33 (Fig. 5) thereof, and an escapement feed 34 feeds the wires step-by-step between molding operations. The machine includes a fixed upper platen 40 heated suitably and supporting an upper die section 41, and a lower platen 42 also heated and supporting a lower die section 43 movable by a hydraulic piston 44 into molding engagement with the upper platen. A knockout plate 45 (Figs. 12 and 13) is carried by the movable platen, and is movable with respect to the lower die section 43, at the lower portion of the travel of the lower platen.

The wires 31 extend from the slack portions thereof over a curved guide 50 through a spilt, adjustably located guide 51 having guide passages 52 therein and through a tensioning clamp 53 having a grooved block 54 urged to the left, as viewed in Figs. 12 and 13, along a guideway 55 by a tension spring 56 secured to the fixed guide 51. A grooved block 57 carried by the block 54 is urged tightly against the wires by compression springs 58 mounted on pins 59 secured to the block 54.

The wires 31 travel from the clamp 53 between swaging dies 61, 62, 63 and 64 and a split, separable guide 65 carried on rods 66 extending slidably through the lower die section 43 and secured rigidly to a carrier plate 67. The wires then pass through grooves 70 in a wire-lifting guide 71 carried by rods 72 slidable in bores 73 formed in the die section 43 and secured rigidly to the carrier plate. Another guide 74 is fixed to the die section 43. The knockout plate 45 is mounted slidably on stop pins 76 extending slidably through the carrier plate 67 and supported by the lower platen 42, and supports knockout pins 77 extending slidably in bores 78 in the die section 43 opening into a mold cavity 79 formed in the die sections. Compression springs 81 urge the knockout plate 45 away from the die section 43 toward stop pins 82 supported by the platen 42 and slidable in bores 83 in the carrier plate 67.

As the lower platen 42 is lowered from its closed or molding position shown in Fig. 13, knockout rams 85 (Fig. 18), in their upper positions, engage the carrier plate 67 and hold the carrier plate, the guides 51 and 65 and the clamp 53 against movement with the platen 42 and the die section 43, until stops 86 on the platen 42 engage the carrier plate. Substantially midway in this movement, rods 87 secured to the carrier plate engage the stripper plate 45 and hold the stripper plate with the carrier plate. The portions of the wires 31 and previously molded blocks 30 to the right of the die section 43 extend along a guide 88, and are held by a feed head 89 mounted on a piston 91 operable by a pneumatic cylinder 92 supported by the carrier plate 67. A tapered, tubular portion 90 of the guide 88 keeps the wires and blocks flat. The feed head 89 is movable along a guideway 94 and carries an escapement pawl 95 thereon which is designed to engage the molded blocks 30 and move them toward the right, as viewed in Fig. 13, but to pass under the strips without moving them when the piston 91 is moved to the left, thereby effecting a feed of the molded blocks and the wires around which the blocks are molded to the right. As the rods 87 engage the stripper plate 45, the portions of the wires 31 on the left of the block 30 in the die section 43 are tensioned by the tensioning clamp 53 and the portions of the wires to the right of that block are tensioned by the pawl 95, which engages the block 30 just to the right thereof.

The portion of the mold cavity 79 in the upper die section 41 is tapered more than the lower die section 43 so that the molded block is pulled out of the upper die section rather than the lower die section as the die sections are opened. As the lower platen 42 is moved farther downwardly relative to the carrier plate, the carrier plate holds the stripper plate 45 and the ejector pins 77 therewith. The combined action of the tension on the portions of the wires 31 at opposite ends of the blocks and the ejector pins 77 move the block completely out of the die section 43, and the tensioned wires raise the block to a position clearing the ejector pins 77 so that the ejector pins do not interfere with subsequent movement of the block and wires.

An upper blade 96 (Fig. 13) is fixed to the upper platen 40, and a lower blade 97 is fixed to the lower platen 42. These blades cooperate to shear wires 31 when the press is closed, thereby forming the combs. The upper die section 41 is fixed to the stationary upper platen 40 supported by posts 101 and is provided with a charging chamber 104 (Figs. 3 and 9) through which pellets or preforms 102 of the thermosetting compound are delivered in a preheated condition, such that an injector ram 103 will force the compound through transfer molding passages 105 (Figs. 9 and 12), the upper surface of the die section 43 forming the bottom of the charging chamber 104, into the mold cavity 79.

The bottom one of the preforms 102 supplied by a magazine 108 rests on a plate 109 (Figs. 3, 6, 7 and 8) detachably mounted in a fixed position on the press. A U-shaped pusher 110 carried by spaced, endless chains 111 in a closed path, the upper portion of which extends along the plate 109 slides the bottom preform out from under the column, and moves it along the plate 109 from the magazine 108 to a position just below a dielectric heating electrode 112. The chains 111 are mounted on drive sprockets 113 and idler sprockets 114, and the drive sprockets 113 are driven by a chain drive 115 driven by a reversible motor 116. The sprockets 113 and 114 are mounted on shafts 117 supported rotatably and adjustably by the plate 109, which has grooves 119 forming tracks for the chains.

When the pusher 110 has been moved to such a position that a preform carried thereby is positioned directly below the electrode 112 and on a lower electrode 118 mounted in a socket in the plate 109, a dog 120 (Fig. 3) carried by one of the chains 111 in a laterally projecting position actuates a limit switch 121 to reverse the motor 116 (Fig. 6) and the pusher 110 is moved back out of the field of the electrode 112 until the pusher 110 actuates a limit switch 124 provided with a one-way type actuator 125 which stops the motor 116, and sets up a circuit to the dielectric heater including the electrodes 112 and 118. The pusher 110 projects from the chains outwardly with respect to the closed path thereof, and, when moved in a forward direction past a lever 122 of the actuator 125, merely swings the lever 122 without actuating the limit switch 124. However, when the pusher is moved in a reverse or clockwise direction, the pusher engages the lever 122 and swings it against the switch 124 to actuate this switch. The dog 120 projects laterally outwardly from one link of the chain 111, and engages and actuates levers 126 of the limit switch 121 and a limit switch 128 as the dog is moved past these levers. The levers 126 are out of the path of the pusher 110 so that the pusher does not actuate the switches 121 and 128.

When the heater is actuated, the electrodes 112 and 118 subject the preform 102 to a very high frequency electrostatic field to heat the preform to a temperature such that it will flow when subjected to pressure. After a short and effective preheating cycle, say from ten to fifteen seconds, which overlaps two molding cycles, the motor 116 is again started to drive the chains 111 in a counter-clockwise direction, as viewed in Fig. 3, and the pusher 110 engages the preheated preform 102 under the electrode 112 and moves it to the charging chamber 104 into which the preform is dropped, the switch 121 being automatically cut out at this time as described hereinafter. After the pusher has travelled around the left-hand end of its path so that it is out of the path of the ram 103, the dog 120 actuates the limit switch 128 to start downward movement of the ram 103 to force the preform through the transfer passages 105 (Figs. 12 and 13) into the mold cavity 79 in the die sections 41 and 43.

Figure 10:
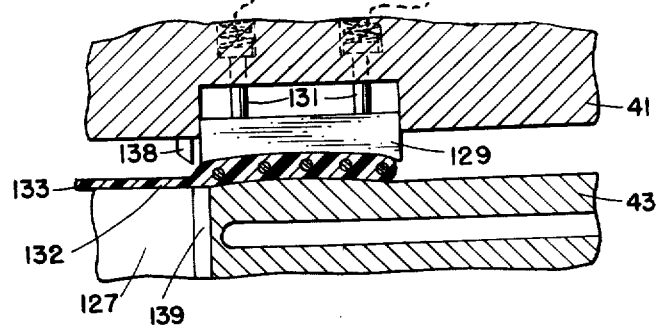
Fig. 10 is a vertical section taken along line 10—10 of Figs. 5 and 13.
Figure 11:
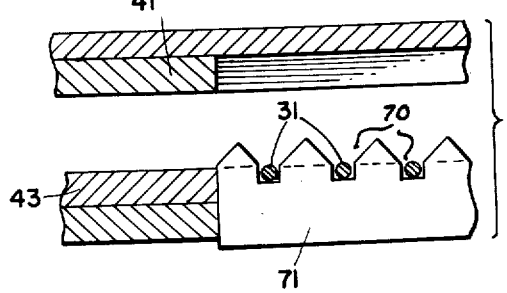
Fig. 11 is a horizontal section taken along line 11—11 of Figs. 5 and 15.

As the lower die section 43 is moved up to the upper die section 41, the block 30 previously molded in the die cavity 79 and now to the right of the cavity 79, as viewed in Figs. 12 and 13, is engaged by a cooled, concave clamp 129 (Fig. 10) normally urged away from the upper die section 41 by compression springs 130 acting on rods 131 supporting the clamp 129. This firmly clamps this block 30 against the lower die section 43, and on continued upward movement of the die section 43, runners 132 secured to a residual disc 133 of molding compounds, which has an anchoring cylinder formed on the lower side thereof just above one of the ejector pins 77 (Fig. 9), from the previous molding operation are moved into engagement with a fixed shear blade 138 (Fig. 10) secured to the upper die section. The blade 138 cooperates with a blade 139 on the lower die section to sever the runners from the block 30, and the severed runners and residual disc drop by gravity through a passageway 127 in the lower die section leading to a waste receptacle (not shown).

Figure 16:
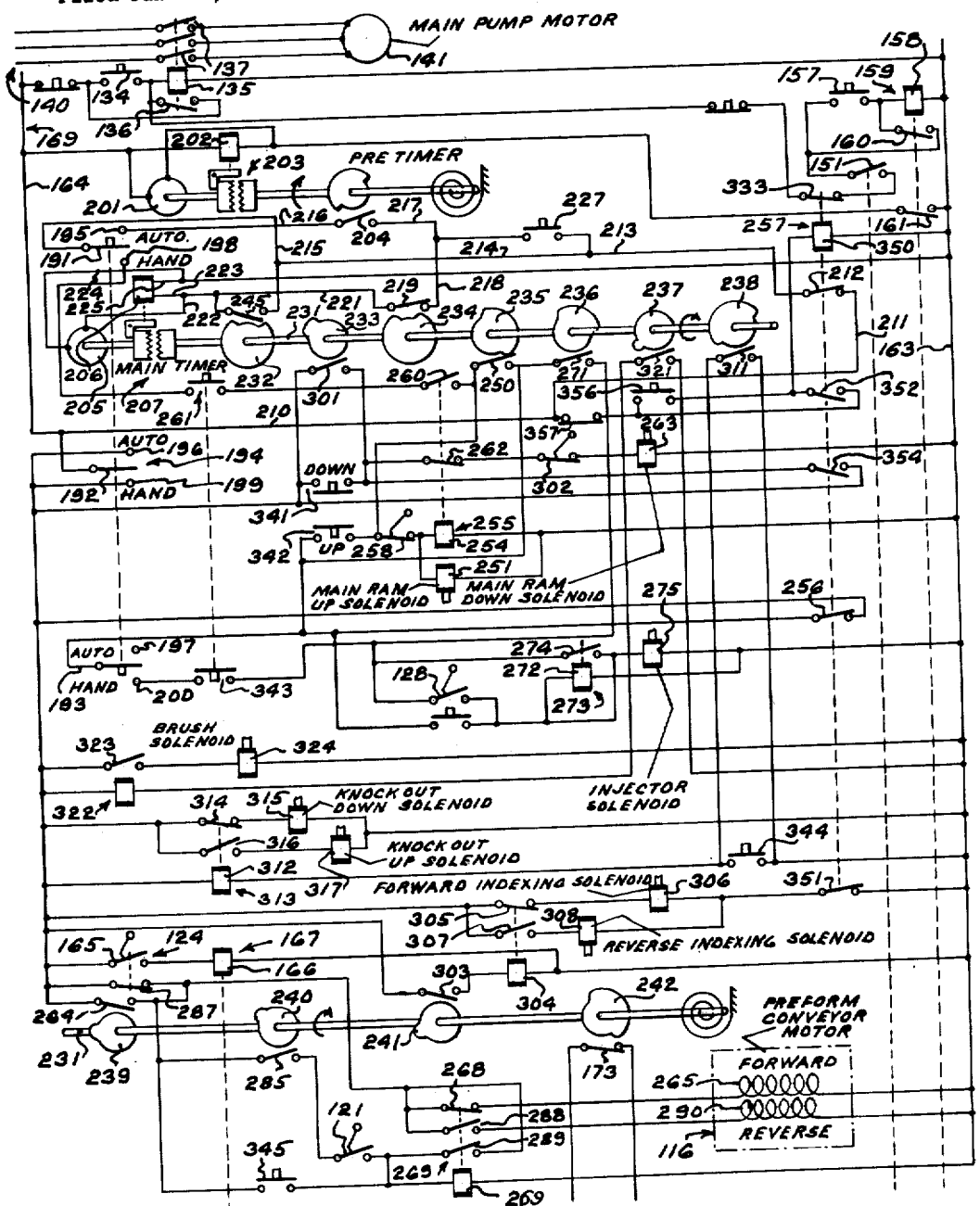
Fig. 16 is a diagrammatic view of a portion of a control circuit associated with the apparatus shown in Fig. 1.

The control circuit (Figs. 16 and 17) includes a manual starting switch 134 and a relay winding 135 having holding contacts 136 and contacts 137 in a powerline 140 for supplying power to a main pump motor 141 driving slippage type pumps, which supply liquids under pressure to the hydraulic systems for operating the press. To start the apparatus, a manual switch 142 (Fig. 17) in a powerline 143 is closed to energize a transformer 144 to energize a filament-heating transformer 145 and a time delay relay winding 146 to close contacts 147 a predetermined period of time later. A momentary switch 148 is closed manually to energize a relay winding 149 of a relay 150 to close contacts 151 and holding contacts 152, which keep the relay winding 149 continuously energized. A momentary switch 157 (Fig. 16) then is closed manually to energize a winding 158 of a relay 159 to close holding contacts 160 and contacts 161 and 162, the winding 158 being connected across conductors 163 and 164 of a powerline 169.

Assuming the pusher 110 is back against the one-way actuator 125 of the limit switch 124 to close contacts 165 of the switch 124 and the relay winding 146 has closed the contacts 147, a relay winding 166 of a relay 167 is energized to close no contacts 168. This completes a circuit through a winding 170 of a relay 171 through the contacts 152 and 147, normally closed timer contacts 173, a manually operable switch 174 in parallel with the contacts 173 being set in its open position, the contacts 162, a manually operable switch 175 set in its closed position, the contacts 168 and the winding 170. This energizes the winding 170 to close contacts 176 to a transformer 177 which supplies power to a dielectric heating circuit 180 of a suitable type including tubes 181, 182, 183, 184 and 185. The circuit 180 includes the electrode 112 and the electrode 118, which heat the preform 102 rapidly to a suitable temperature for transfer molding.

Contactors 191, 192 and 193 of a switch 194 are set manually into engagement with contacts 195, 196 and 197, respectively, for automatic operation. The switch also has contacts 198, 199 and 200 for manual control of the press. After the contacts 136 and 161 are closed, a motor 201 and a clutch winding 202 of a pretimer 203 are energized, close contacts 204 a predetermined period of time later, and keep the contacts 204 closed throughout the repeated operations of the apparatus. The contacts 204 close a circuit to a timer motor 205 and a timer clutch winding 206 of a main timer 207 of a reset type from the conductor 162 to the conductor 163 through the contactor 192, the contacts 196, conductors 210 and 211, normally closed relay contacts 212, conductors 213, 214 and 215, the contactor 191, the contact 195, a conductor 216, the pretimer contacts 204, conductors 217 and 218, normally closed starting contacts 219 of the timer 207, conductors 221, 222 and 223, the motor 205 and the clutch winding 206 and conductors 224, 225 and 226. A switch 227 is provided for the purpose of operating only the timer 207 when adjusting the timer.

The main timer 207 runs to turn a shaft 231 and adjustable cams 232, 233, 234, 235, 236, 237, 238, 239, 240, 241 and 242. The cam 232 closes contacts 245 in parallel with the contacts 204 and 219 to lock in the timer 207, and the cam 234 then opens the contacts 219. The timer 207 then turns the cam 235 to close contacts 250, which close a circuit to a main ram up solenoid 251 of a four-way valve 252 (Fig. 18) to cause the lower platen 42 to be raised and energize a relay winding 254 of a relay 255 through contacts 256 of a relay 257, the contacts 250 and a limit switch 258, which protects the press if the die sections are removed therefrom. The relay 255 closes contacts 260 to manually operable, jogging switch contacts 261, and also opens contacts 262 in series with a main ram down solenoid 263, which, when energized, causes the lower platen to be lowered. The die section 43 on the lower platen 42 then is forced tightly against the die section 41 on the upper platen.

After the press closes and the preform is heated to a moldable temperature, the timer cam 242 opens the contacts 173 to drop out the relay 171 to deenergize the dielectric heating circuit 180. Immediately thereafter, the cam 239 closes momentarily contacts 264 to close an energizing circuit to a forward winding 265 of the preform conveyor motor 116 through contacts 268 of a relay 269. The conveyor motor then is run in a forward direction to cause the pusher 110 (Fig. 3) to engage the preheated preform 102, slide the preform to the lefthand end of the conveyor, as viewed in Fig. 3, and drop the preform into the charging chamber 104, contacts 285 (Fig. 16) of the timer 207 being open as the dog 120 passes the limit switch 121 at this time.

The pusher 110 then travels around the left-hand end of the conveyor, as viewed in Fig. 3, to clear the injection ram 103, and the dog 120 actuates the limit switch 128 to close it momentarily. Simultaneously with the closing of the limit switch 128, the cam 236 (Fig. 16) closes contacts 271 to energize a winding 272 of a relay 273 to close contacts 274. This closes an energizing circuit to an injector-ram-actuating solenoid 275 and locks in the relay 273. The dog 120 moves away from the limit switch 128 shortly thereafter, and the limit switch 128 opens. The injector-ram-actuating solenoid 275 actuates a valve 276 (Fig. 18) to cause liquid under pressure to move the injector ram 103 (Fig. 3) downwardly to force the preform 102 into the molding cavity in the dies from the charging chamber 104 and hold the materail under heat and pressure until it is set.

Meanwhile the conveyor 111 is driven in a counterclockwise direction, as viewed in Fig. 3, and the pusher 110 moves the bottom preform 102 from under the magazine 108, and slides it between the electrodes 112 and 118, at which point the lug 120 closes the limit switch 121. Just before the limit switch 121 is closed, the cam 240 (Fig. 16) closes the contacts 285 to energize a winding 286 of the relay 269 through contacts 287 of the limit switch 124. The relay 269 then opens the contacts 268 to stop the conveyor and closes contacts 288 and 289 to energize a reverse winding 290 of the conveyor motor 116. The motor 116 drives the pusher 110 to the right, as viewed in Fig. 3, back out of the field of the electrodes 112 and 118 until the pusher 110 actuates the limit switch 124 to open the contacts 287 to stop the conveyor and close the contacts 165 to actuate the relay 167 to close the contacts 168 to set up the dielectric heater circuit 180 for actuation when the cam 242 again permits the contacts 173 to close.

After the compound is cured, the cam 235 permits the contacts 250 to open, and the relay 255 and the main ram up solenoid 251 are dropped out. The cam 233 then closes contacts 301 to energize the main ram down solenoid 263 through the contacts 301 and 262 and a limit switch 302. The solenoid 263 actuates the valve 252 (Fig. 18) to cause the main ram 44 to lower the platen 42 to its lowermost position, at which point the lower platen opens the limit switch 302 to deenergize the solenoid 263.

Before the platen 42 is lowered, the cam 241 closes contacts 303 to actuate a relay 304 to open contacts 305 to a forward indexing solenoid 306 and close contacts to a reverse indexing solenoid 307. This actuates a valve (not shown) to cause the piston 91 to move the pawl 95 to the left, as viewed in Fig. 13, to set the pawl slightly behind a block 30 previously molded on the wires 31. Also, while the platens 40 and 42 are closed, the cam 238 closes contacts 311 to energize a winding 312 of a relay 313 to open contacts 314 to a knockout down solenoid 315 and close contacts 316 to a knockout up solenoid 317. The solenoid 317 then actuates a valve 318 (Fig. 18) controlling knockout rams 85 to raise the knockout rams to their uppermost positions. Then, when the lower platen 42 is lowered, the knockout rams are engaged by the carrier plate 67 (Fig. 13) and hold the plate 67 against further downward movement with the lower platen. The clamp 53, the guides 65, 71 and 88 and the indexing mechanism 38 are help up with the carrier plate 67 to hold up the portions of the wires at the ends of the lower die section 43 to cause the wires to pull upwardly on the molded block 30 in the lower die section 43.

On continued downward movement of the lower platen, the knockout plate 45 and the knockout pins 77 eject the block 30 from the lower die section 43. Then tension spring 56 then pulls the ladder-like structure to the left, as viewed in Fig. 12 to raise the block 30 out of contact with the pins 77. Shortly thereafter, the cam 241 (Fig. 16) permits the contacts 303 to open, thereby dropping out the relay 304 to energize the forward indexing solenoid 306. This causes the piston 91 to move the pawl 95 to the right, as viewed in Fig. 13, and the pawl pulls the wires and blocks to the right an exact predetermined distance to bring the swaged portions of the wires into the die cavity 79 in the lower die section. The cam 242 may be set to close the contacts 173 at any desired point in the cycle, for example at the time the press is opened, to start the heating cycle of the preform 102 positioned between the electrodes 112 and 118. After the wires are fed forward, the cam 241 permits the contacts 303 to open to drop out the relay 304. This reverses the knockout rams, and lowers them to their retracted positions.

While the press was closed, the cam 237 closes contacts 321 to actuate momentarily a relay 322 to close contacts 232 to a solenoid 324, which actuates a pneumatic cylinder 325 to move brushes 326 across the wires 31 at the ends of the molded block 30. Thus, the brushes 326 brush flash from the wires without lengthening the time of the molding cycle.

The cam 232 (Fig. 16) permits the contacts 245 to open to drop out the timer motor 205 and the timer clutch winding 206 after the knockout rams are reversed, and the timer resets rapidly to zero, that is, to its starting condition. In the starting condition of the timer 207, the contacts 219 are permitted to close, which, the pretimer 203 not being affected by the resetting of the timer 207 so that the contacts 204 remain closed, start the timer motor 205 and the clutch winding 206 to start the timing cycle again. The press then goes through another molding cycle similar to the one just described.

For manual operation, to adjust the press, the switch 194 is moved so that the contactors 191, 192 and 193 engage the contacts 198, 199 and 200, respectively. This cuts out the timer 207, and manually operable switches 261, 341, 342, 343, 344, 345, 174 and 175 paralleling the contacts of the timer 207 permit jogging operation of the apparatus. The relay 257 is provided for stopping the apparatus in the event of an emergency and includes a winding 350, contacts 351, holding contacts 352, normally closed contacts 353 and 256 and normally open contacts 354 paralleling the contacts 301 and the switch 341 for actuating the main ram down solenoid 263. The relay 257 may be actuated by a manually operable, normally open, momentary switch 356, and may be dropped out by actuating manually a normally closed, momentary switch 357.

*Operation*

To start the apparatus, the switches 134, 142, 148 and 157 are closed, the switch 174 is opened, and the switch 194 is actuated to its automatic position. After the filaments of the tubes 181, 182, 183, 184 and 185 of dielectric heater have warmed up, the time delay relay winding 146 closes the contacts 147, and, assuming the pusher 110 is back against the one-way limit switch actuator 125 to close contacts 165 of the switch 124, the relay 167 is energized to close contacts 168 to cause the dielectric heating circuit 180 to heat the preform 102 rapidly to a suitable temperature for transfer molding. Closing of the switches 134, 148 and 157 start the pretimer 203, which closes the contacts 204 to start the main timer 207 after the heating circuit has been actuated a predetermined period of time. The timer 207 then closes the running contacts 245 and opens the restarting contacts 219.

Shortly after starting, the timer 207 closes the contacts 250 to energize the main ram up solenoid 251, and the main ram 44 raises the lower die section 43 to the upper die section 41 to close them. Just before the die sections close, the previously molded block 30 is engaged by the cooled concave clamp 129 (Fig. 13) to firmly clamp this block 30, and, on continued upward movement of the die section, the runners 132 secured to the residual disc 133 of molding compound are moved into engagement with the fixed shear blade 138 secured to the upper die section. The blade 138 cooperates with the blade 139 on the lower die section 43 to sever the runners from the block 30, and the severed runners and residual disc drop by gravity through the passageway 127 in the lower die section 41. The clamp 129 holds the block as this shearing takes place, and also presses the block 30 tightly against the platen 42 to prevent warping. The blades 96 and 97 sever the wires 31 to form the comb, the swaging dies 61, 62, 63 and 64 close to flatten the wires to form anchors thereon, and the brushes are moved across the ends of the molded block to brush the flash from the wires.

After the preform 102 arrives at its molding temperature, and the press closes, the timer cam 242 opens the contacts 173 to drop out the relay 171 to deenergize the dielectric heating circuit 180. Immediately thereafter, the cam 239 closes momentarily the contacts 264 to cause energization of the forward winding 265 of the preform conveyor motor 116. The conveyor motor then is run in a forward direction to cause the pusher 110 to engage the preform 102, slide the preform to the left-hand end of the conveyor, as viewed in Fig. 3, and drop the preform into the charging chamber 104.

The pusher then travels around the lefthand end of the conveyor to clear the injection ram 103, and the dog 120 actuates the limit switch 128 to close it momentarily. Simultaneously with or just before the closing of the limit switch 128, the cam 236 (Fig. 16) closes contacts 271 to actuate the relay 273 to close contacts 274. This closes an energizing circuit to the injector-ram-actuating solenoid 275 and locks in the relay 273. The dog 120 (Fig. 3) moves away from the limit switch 128 shortly after actuating it. The injector-ram-actuating solenoid 275 (Fig. 16) actuates the valve 276 to cause liquid under pressure to move the injector ram 103 (Fig. 3) downwardly to transfer the preform into the molding cavity in the dies from the charging chamber 104 and hold the compound under heat and pressure until it is set.

After the conveyor delivers the preform to the charging chamber, it continues in a counter-clockwise direction, as viewed in Fig. 3, and the pusher 110 moves the bottom preform 102 from under the magazine, and slides it between the electrodes 112 and 118, at which point the dog 120 closes the limit switch 121. Just before the limit switch 121 is closed, the cam 240 closes contacts 285 so that the switch 121 actuates the relay 269 through the contacts 287 of the limit switch 124. The relay 269 opens the contacts 268 to stop the conveyor and closes the contacts 288 and 289 to energize the reverse winding 290 of the conveyor motor 116. The motor 116 then drives the pusher 110 to the right, as viewed in Fig. 3, back out of the field of the electrodes 112 and 118 until the pusher actuates the limit switch 124 to open the contacts 287 to stop the conveyor and close the contacts 165 to actuate the relay 167 to close the contacts 168 to set up the dielectric heater circuit 180 for actuation when the cam 242 again permits the contacts 173 to close. The contacts 285 then are permitted to open by the cam 240.

During the molding and curing steps, the cam 241 closes contacts 303 to actuate the relay 304, which opens the contacts 305 to the forward indexing solenoid 306 and closes contacts to the reverse indexing solenoid 307. This actuates the valve (not shown) to the cylinder 92 to cause the piston 91 to move the pawl 95 to the left, as viewed in Fig. 13, to move the pawl to a position spaced from and slightly behind the previously molded block 30 on the wires 31. The cam 238 then closes the contacts 311 to actuate the relay 313 to open the contacts 314 to the knockout down solenoid 315 and close the contacts 316 to the knockout up solenoid 317. The solenoid 317 then actuates the valve 318 (Fig. 18) to the knockout rams 85 to raise the knockout rams to positions in which they will be engaged by the carrier plate 67 when the main ram 44 lowers the platen 42.

After the compound is cured, the cam 235 permits the contacts 250 to open, and the relay 255 and the main ram up solenoid 251 are dropped out. The cam 233 then closes contacts 301 to energize the main ram down solenoid 263 through the contacts 301 and 262 and the limit switch 302. The solenoid 263 actuates the valve 252 to cause the main ram 44 to lower the platen 42 to its lowermost position, at which point the platen 42 opens the limit switch 302 to deenergize the solenoid 263.

As the lower platen 42 is lowered from its closed or molding position shown in Fig. 13, the guides 65 and 88 and the presser clamp 129 pull the molded block 30 away from the upper die section 41. Subsequently, the knockout rams 85 in their upward positions are engaged by the carrier plate 67 and hold the carrier plate, the guides 51, 65, 71 and 88, and the clamp 53 against movement with the platen 42 and the die section 43 until the stops 86 on the platen 42 engage the carrier plate. Roughly midway in this relative movement between the carrier plate 67 and the lower platen 42, the rods 87 secured to the carrier plate are engaged by the knockout plate 45 and hold the knockout plate with the carrier plate. As the rods 87 engage the knockout plate 45, the portions of the wires 31 to the left of the block 30 in the die section 43 are tensioned by the tensioning clamp 53 and the portions of the wires to the right of that block are tensioned by the pawl 95, which engages the block 30 just to the right thereof.

As the platen 42 and the die section 43 are moved further, the knockout plate 45 and the ejector pins 77 eject the block 30, the residual disc 133 and the anchoring cylinder secured thereto from the die section 43. The combined action of the tension on the portions of the wires 31 at opposite ends of the blocks and the ejector pins 77 move the block completely out of the die section 43, and the tensioned wires raise the ejected parts to a position clearing the ejector pins 77 so that the ejector pins do not interfere with subsequent movement of the block and wires. The spring-pulled clamp 53 takes up slack in the wires and keeps them tensioned as the block is ejected. Shortly thereafter, the cam 241 (Fig. 16) permits the contacts 303 to open, thereby dropping out the relay 304 to energize the forward indexing solenoid 306. This causes the piston 91 to move the pawl 95 to the right, as viewed in Fig. 13, and the pawl pulls the wires to the right, an exact, predetermined distance to bring swaged portions of the wires over the die cavity in the lower die section 43.

The cam 242 with one type of molding compound closes the contacts 173 before the press is opened to start preheating the preform 102 positioned between the electrodes 112 and 118. After the wires are fed forward, the cam 238 permits the contacts 311 to open to drop out the relay 313. This reverses the knockout rams 85 and lowers them to their retracted positions.

The cam 232 then permits the contacts 245 to open to drop out the timer motor 205 and the timer clutch winding 206, and the main timer 207 resets rapidly to zero, that is, to its starting condition. In the starting condition of the timer 207, the contacts 219 are permitted to close, which, the pretimer 203 not being affected by the resetting of the main timer 207 so that the contacts 204 remain closed, start the timer motor 205 and the clutch winding 206 to start the timing cycle again. The press then goes through another molding cycle similar to the one just described.

The above-described apparatus automatically molds and cures thermosetting compounds, thereby necessitating very little attention from an operator thereof. Also, each cycle of the press is uniform and of very short duration even though many steps are effected during each cycle. Since one preform is preheated during the molding cycle of the preceding preform and the press-closing portion of the succeeding molding operation, the transferring and curing portion of the cycle is very short and precise control is effected.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for molding articles including a pair of die sections movable relative to one another between open and closed positions, means for advancing a wire between the dies, means for opening and closing the dies, means for holding the wire in a plane between the dies when the dies are opened and ejecting means for ejecting a part molded around the wire from the dies, the improvement comprising resilient means for tensioning the wire as the ejecting means is operated to pull the molded part out of contact with the dies, and means for advancing the wire and the part molded thereon while the dies are opened.

2. In a molding press including a pair of relatively movable dies having a charging chamber and a molding cavity therein, means for opening and closing the dies and injector ram means for transferring molding compound supplied to the charging chamber to the cavity, the improvement comprising a pair of endless conveyor chains, means mounting the conveyor chains in laterally spaced positions for travel along paths extending to the charging chamber at one end thereof, a magazine maintaining a plurality of preforms of molding compound in a column at the other end of the path, a support extending from the column to the charging chamber for supporting the preforms in the magazine, a U-shaped pusher carried by the chains in a position such as to sweep the support and push a preform from under the magazine to carry it along the support and eventually discharge into the charging chamber when the chains are driven in a forward direction, a dielectric heater positioned between the magazine and the charging chamber, a reversible electrical motor for driving the conveyor chains, means for actuating the motor to drive the chains in a forward direction to move the pusher from a position in front of the magazine and behind the heater past the heater and around the path of chains past the magazine and to the heater to feed a preform at the heater to the charging chamber and push another preform from the magazine and deliver the latter preform to the heater, means for actuating the electrical motor to move the chains in a reverse direction to move the pusher from the heater to a position between the heater and the magazine, automatic means for repeatedly closing the dies, actuating the injector ram means and opening the dies, and means operable in timed relationship with the operation of the last-mentioned means for actuating the heater to dielectrically heat the preform thereat.

3. In a molding press including a pair of relatively movable dies having a charging chamber and a molding cavity therein, means for opening and closing the dies and injector ram means for transferring molding compound supplied to the charging chamber, the improvement comprising a pair of endless conveyor chains, means mounting the conveyor chains in laterally spaced positions for travel along elongated, closed paths extending to the charging chamber at one end thereof, means for feeding preforms of molding compound to the other end of the paths, a support extending from the preform feeding means to the charging chamber for supporting a preform, a U-shaped pusher carried by the chains in a position such as to sweep the support and push a preform along the support and eventually discharge it into the charging chamber when the chains are driven in a forward direction, a heater positioned between the preform-feeding means and the charging chamber, a reversible electrical motor for driving the conveyor chains, means for actuating the motor to drive the chains in a forward direction to move the pusher from a position in front of the preform-feeding means and behind the heater, past the heater, around the path of chains and past the preform-feeding means to the heater to feed a preform at the heater to the charging chamber to push another to the heater, means for actuating the electrical motor to move the chains in a reverse direction to move the pusher from the heater to a position between the heater and the preform-feeding means, and means for repeatedly closing the dies, actuating the injector ram means and opening the dies.

4. In a molding apparatus including a press provided with a pair of relatively movable dies having a charging chamber and a molding cavity therein and injector ram means for transferring molding compound from the charging chamber to the molding cavity, the improvement comprising a pair of endless conveyor chains, means mounting the conveyor chains in laterally spaced positions for travel along elongated paths extending generally horizontally to the charging chamber at one end thereof and a point remote therefrom at the other end thereof, means for feeding a preform of molding compound to the end of the paths remote from the charging chamber, a support extending from the remote end of the paths to the charging chamber for supporting the preforms, a U-shaped pusher carried by the chains in a position such as to sweep the support and push a preform from the remote end of the path to carry it along the support and eventually discharge it into the charging chamber when the chains are driven in a forward direction, a dielectric heater positioned between the ends of the paths, a reversible electrical motor for driving the conveyor chains, means for actuating the motor to drive the chains in a forward direction to move the pusher from a position behind the heater toward the charging chamber, means for reversing the motor, a timer, means for resetting and restarting the timer after it has timed out, means operable by the timer for actuating the press to close the dies, means operable by the timer for actuating the forward actuating means to move the pusher from a starting position between the remote end of the support and the dielectric heater, past the dielectric heater to move a preform at the heater to the charging chamber and in the same direction around the path of the conveyor chains to pick up a preform at the remote end of the support and move it to the dielectric heater, means for actuating the motor-reversing means to move the pusher from the dielectric heater in a reverse direction back to its starting position, means for actuating the injector ram means when the pusher clears the path thereof after depositing a preform in the charging chamber, and means operable by the timer for actuating the press to open the dies.

5. A molding apparatus, which comprises a pair of separable molding sections having a mold cavity therein, means for opening and closing the molding sections, means for advancing a wire in a predetermined direction between the molding sections when the sections are open, means at the approach side of the molding sections for gripping the wire, means at the recess side of the molding sections for limiting movement of the wire in a direction opposite to said direction of advancement of the wire, means for forcing a molding compound into the mold cavity around the wire, means for effecting relative movement between the wire-gripping means and the die sections as the die sections are opened, means for ejecting a molded part from the other die section as the die sections are opened, whereby the part travels with the first die section and tensions the wire, resilient means permitting travel of the gripping means as the wires are tensioned, and means for ejecting the part from the first die section as the wires are tensioned.

6. A molding apparatus, which comprises a first molding section, a second molding section, said molding sections having recesses forming a molding cavity, means for moving the first section between a closed position with respect to the second section and an open position with respect to the second section to mold a plastic compound into a block on the wire when the first molding section is in its closed position, means for feeding the wire and blocks molded thereon in a predetermined direction between the molding sections when the first section is in its open position, a clamp mounted on the approach side of the first section for gripping the wire and preventing lateral movement of the wire relative thereto, resilient means urging the clamp in a direction opposite to the direction of feed of the wire, wire-guiding means positioned on the side of the first section opposite to that of the clamp for preventing movement of the wire in a direction opposite to that in which the wire is fed and preventing lateral movement of the wire relative thereto, means for carrying the clamp and the wire-guiding means with the first molding section during the first portion of the movement of the first section toward its open position to pull a molded block from the second molding section and holding the clamp and the wire-guiding means against movement with the first section during the remainder of the movement of the first section to its open position to tension the wire and pull the clamp against the action of the resilient means, means for ejecting the block from the first molding section after the wire is tensioned so that the clamp pulls the block away from the first molding section, and means operable after the block has been pulled away from the mold for actuating the wire-feeding means.

7. A molding apparatus, which comprises a movable lower ram, a lower mold having a molding cavity therein mounted on the lower ram, means for feeding wires over the lower mold positioned at one end of the mold and liftable with the ram, wire-clamping means positioned at opposite ends of the mold and liftable with the ram, an upper mold having an open-ended charging chamber offset from the molding cavity in the lower mold and also having a sprue in the passage, one end of the charging chamber being closed by the lower mold when the lower mold is moved by the ram into engagement with the upper mold, an upper ram for forcing plastic compound from the charging chamber into the molding cavity while the lower mold is in engagement with the upper mold to form a block on the wire, a residue on the lower mold and a sprue therebetween, means for limiting downward movement with the lower mold of the wire-feeding means and the wire-clamping means as the lower ram lowers the lower mold so that the wire-feeding means and the wire-clamping means tension the portion of the wire therebetween, means for ejecting the block, the residue and the sprue from the lower mold after the wires are tensioned, means for actuating the wire-feeding means after the operation of the ejecting means, and shear blades secured to the molds for severing the sprue from the block on the next movement of the lower mold into engagement with the upper mold.

8. A molding apparatus, which comprises an upper mold, a lower mold movable between an open position spaced substantially from the upper mold and a closed position in engagement with the upper mold, means for moving the lower mold between said positions, said molds being provided with a separable charging chamber, a separable molding cavity and a separable sprue passage connecting the chamber to the cavity, means for forcing plastic compound from the charging chamber through the sprue passage into the molding cavity to form a block on a wire extending through the mold cavity, a wire clamp mounted at one side of the mold cavity and urged away from the mold cavity for gripping the wire, wire-feeding means mounted at the opposite side of the mold cavity actuatable to pull the wire and any blocks molded thereon between the molds, means moving the wire clamp and the wire-feeding means away from the upper mold during the initial portion of movement of the lower mold away from the upper mold to pull the molded block, sprue and residue from the upper mold and holding the wire clamp and the wire-feeding means against movement with the lower mold during the remainder of the movement of the lower mold away from the upper mold to tension the wire, means urging the wire clamp away from the wire-feeding means to tension the wire as the block is pulled down with the lower mold, and means for ejecting the block, the sprue and the residue from the lower mold when it is in its open position, whereby the tensioned wires pull these parts out of contact with the lower mold.

9. A molding apparatus, which comprises a stationary upper mold having a charging chamber and a sprue passage therein, a movable lower mold having a molding cavity therein, means for moving the lower mold to and from the upper mold, an injector ram movable into and out of the charging chamber, an endless conveyor element mounted for movement along a path having one end adjacent to the charging chamber, a pusher carried by the conveyor element, dielectric heating means positioned along the path, a magazine for feeding preforms to the pusher one at a time as the pusher is moved therepast, means for advancing the conveyor elements in such a direction that the pusher pushes a preform from the magazine toward the dielectric heating means and the charging chamber, means for advancing the conveyor element in the direction opposite to said direction when the preform is at the dielectric heating means, means for stopping the last-mentioned advancing means before the pusher reaches the magazine, means for periodically actuating the mold-moving means through a cycle in which the lower mold is moved to the upper mold, is held in engagement with the upper mold and is moved away from the upper mold, means operable in synchronism with the movement of the lower mold for actuating the first advancing means to move the pusher so as to feed the preform from the dielectric heating means to the charging chamber just after the mold is moved to the upper mold, move the pusher around past the magazine to the heating means to feed a second preform thereto, means for actuating the second advancing means as the second preform arrives at the heating means, means for actuating the injector ram after the pusher has passed the charging chamber, and means for actuating the dielectric means after the pusher is retracted and deenergizing the heating means before the pusher picks up the preform at the heating means.

References Cited in the file of this patent

UNITED STATES PATENTS

| | | |
|---|---|---|
| 2,369,291 | Frank et al. | Feb. 13, 1945 |
| 2,471,148 | Gale et al. | May 24, 1949 |
| 2,480,313 | Alden | Aug. 30, 1949 |
| 2,568,771 | Smith | Sept. 25, 1951 |
| 2,710,988 | Willcox et al. | June 21, 1955 |

UNITED STATES PATENT OFFICE

CERTIFICATE OF CORRECTION

Patent No. 2,794,211 June 4, 1957

Raymond W. Brown et al.

It is hereby certified that error appears in the printed specification of the above numbered patent requiring correction and that the said Letters Patent should read as corrected below.

Column 5, line 16, after "close" strike out "no"; column 6, line 23, for "materail" read -- material --; line 71, for "help" read -- held --; column 7, line 24, for "232" read -- 323 --; column 13, line 32, for "elements" read -- element --.

Signed and sealed this 11th day of February 1958.

(SEAL)
Attest:
KARL H. AXLINE
Attesting Officer

ROBERT C. WATSON
Commissioner of Patents